(12) United States Patent
Wang et al.

(10) Patent No.: US 8,419,263 B2
(45) Date of Patent: Apr. 16, 2013

(54) LIGHT SOURCE MODULE PROVIDED WITH A LIGHT GUIDE PLATE HAVING REFLECTIVE STRUCTURE THEREON

(75) Inventors: Chiung-Han Wang, Kaohsiung County (TW); Chun-Shiang Yan, Penghu County (TW); Ren-Wei Huang, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 277 days.

(21) Appl. No.: 12/779,959

(22) Filed: May 14, 2010

(65) Prior Publication Data

US 2011/0228556 A1 Sep. 22, 2011

(30) Foreign Application Priority Data

Mar. 22, 2010 (TW) .............................. 99108355 A

(51) Int. Cl.
*F21V 7/04* (2006.01)
(52) U.S. Cl.
USPC ........... 362/623; 362/624; 362/625; 362/626; 362/615
(58) Field of Classification Search .......... 362/615–629; 349/65
See application file for complete search history.

(56) References Cited

U.S. PATENT DOCUMENTS

| 6,099,134 | A | 8/2000 | Taniguchi et al. | |
|---|---|---|---|---|
| 6,447,136 | B1 * | 9/2002 | Liu et al. | 362/625 |
| 7,131,764 | B2 * | 11/2006 | Hsu et al. | 362/623 |
| 8,277,105 | B2 * | 10/2012 | Kim et al. | 362/609 |
| 2005/0270802 | A1 | 12/2005 | Hsu et al. | |
| 2007/0189040 | A1 * | 8/2007 | Chi et al. | 362/620 |
| 2008/0123366 | A1 * | 5/2008 | Yang et al. | 362/625 |
| 2008/0130319 | A1 * | 6/2008 | Hsung et al. | 362/626 |

FOREIGN PATENT DOCUMENTS

| CN | 2496052 Y | 6/2002 |
|---|---|---|
| CN | 1542466 A | 11/2004 |

(Continued)

OTHER PUBLICATIONS

"First Office Action of China Counterpart Application", issued on Apr. 14, 2011, p. 1-p. 3.

(Continued)

*Primary Examiner* — Robert May
(74) *Attorney, Agent, or Firm* — Jianq Chyun IP Office

(57) ABSTRACT

A light source module including a light guide plate (LGP) and a light source device is provided. The LGP has a light exiting surface, a light reflecting surface opposite to the light exiting surface and at least one light entering surface connecting the light exiting surface and the light reflecting surface. The LGP has light reflective structures disposed on the light reflecting surface and each including a closed light active region and protrusions disposed in the light active region. The light active region and the light reflecting surface are not coplanar. The protrusions extend outward from the LGP. The light source device is disposed corresponding to the light entering surface. The light source device provides a light entering the LGP from the light entering surface and exiting the LGP from the light exiting surface after the light is redirected by one of the protrusions on the light reflecting surface.

30 Claims, 12 Drawing Sheets

FOREIGN PATENT DOCUMENTS

| | | |
|---|---|---|
| CN | 101359066 A | 2/2009 |
| JP | 2006-301518 | 11/2006 |
| TW | 351802 | 2/1999 |
| TW | I238898 | 9/2005 |
| TW | I266845 | 11/2006 |
| TW | M321111 | 10/2007 |
| TW | 200802004 | 1/2008 |
| TW | M347588 | 12/2008 |

OTHER PUBLICATIONS

"First Office Action of China Counterpart Application", issued on Jun. 26, 2012, p. 1-p. 5.

"Search Report of China Counterpart Application", issued on Jun. 26, 2012, p. 1-p. 2.

* cited by examiner

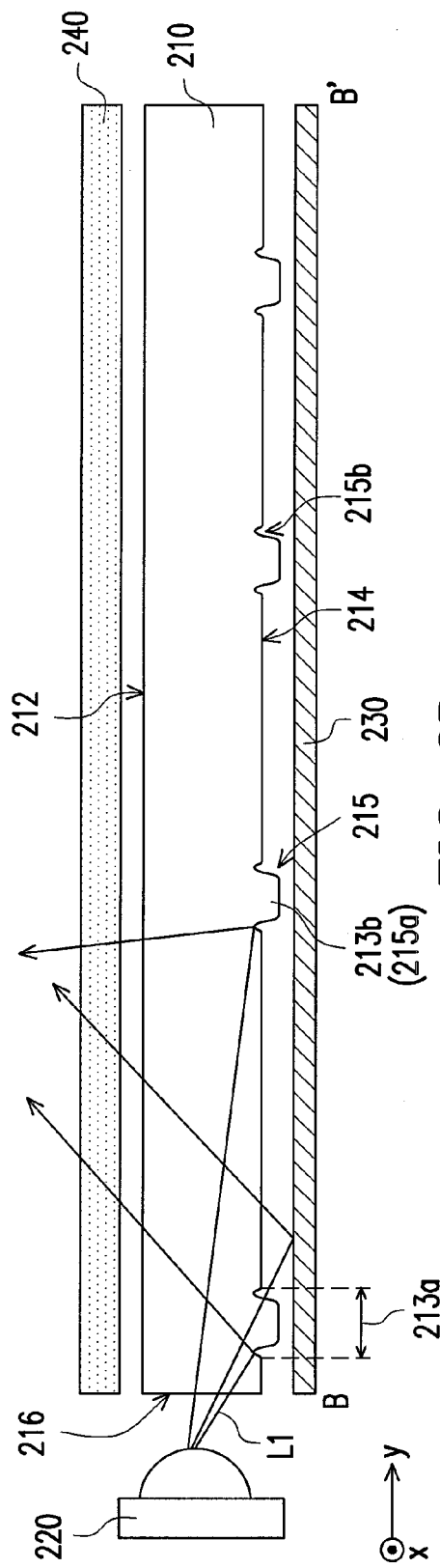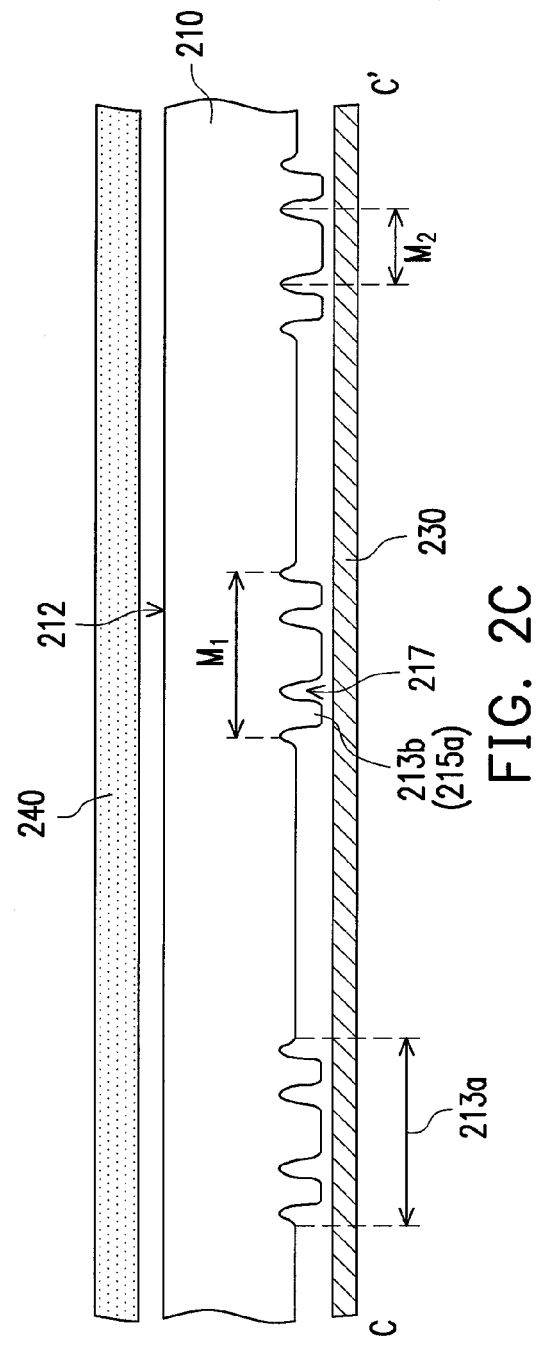
FIG. 2B
FIG. 2C

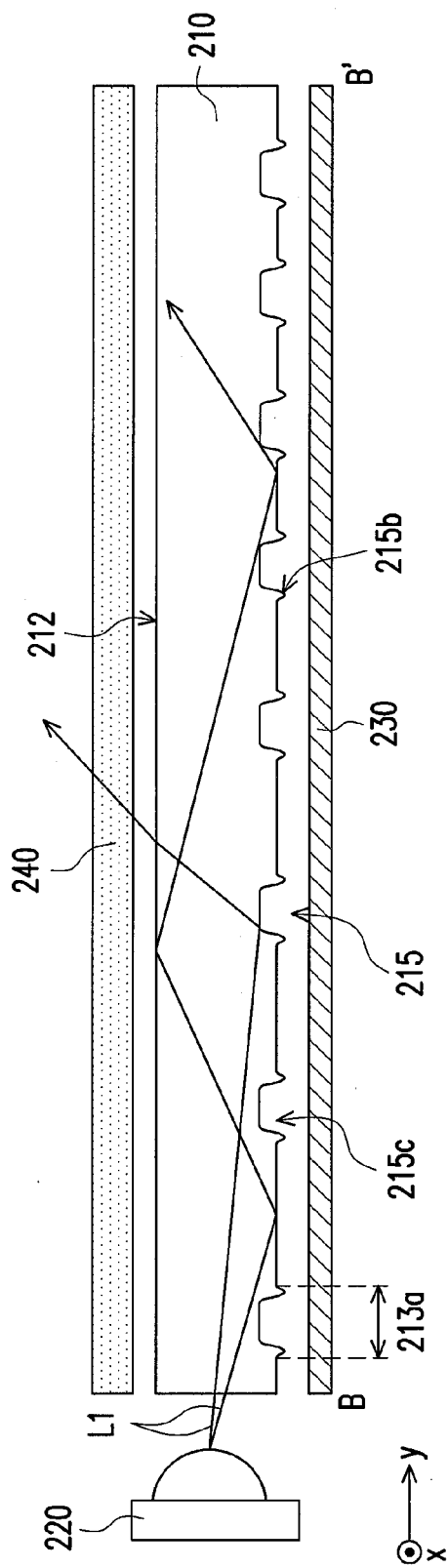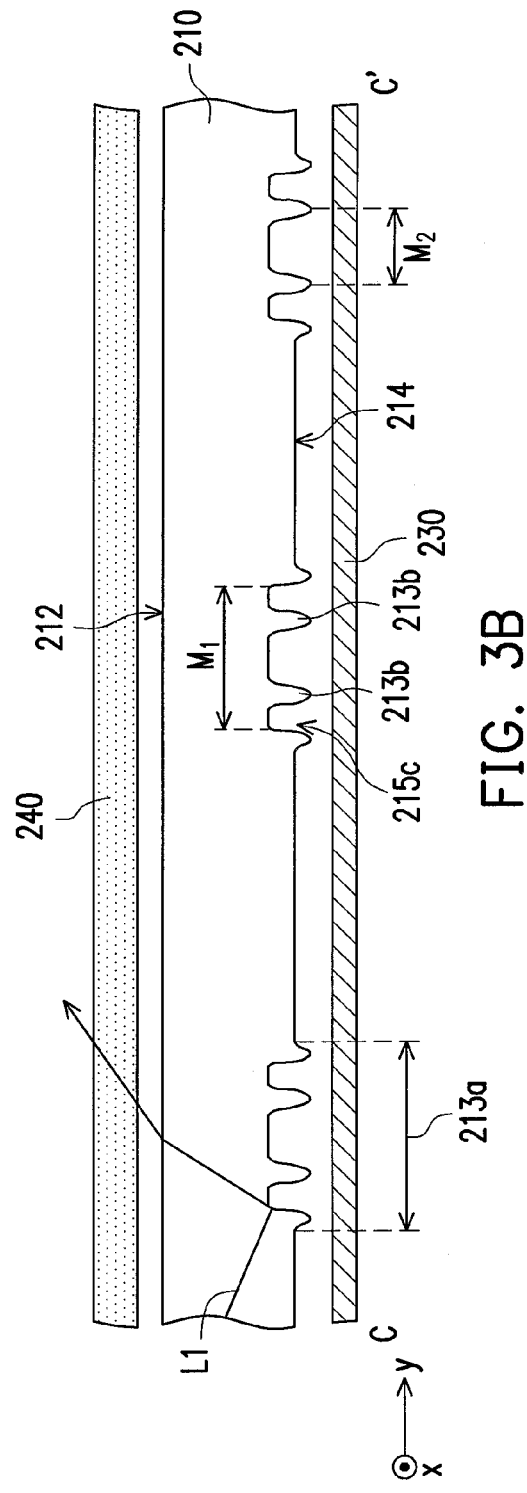
FIG. 3A
FIG. 3B

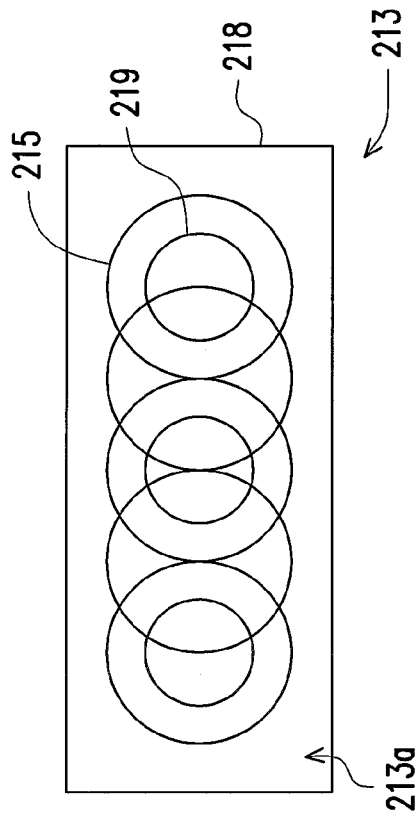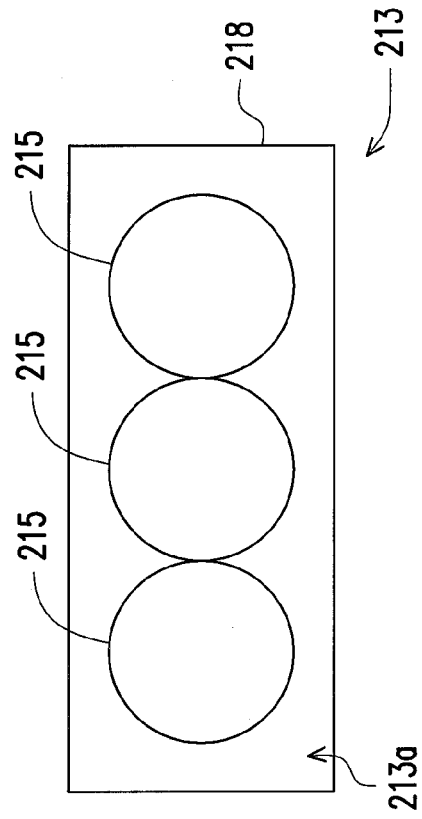

LIGHT SOURCE MODULE PROVIDED WITH A LIGHT GUIDE PLATE HAVING REFLECTIVE STRUCTURE THEREON

CROSS-REFERENCE TO RELATED APPLICATION

This application claims the priority benefit of Taiwan application serial no. 99108355, filed on Mar. 22, 2010. The entirety of the above-mentioned patent application is hereby incorporated by reference herein and made a part of specification.

BACKGROUND OF THE INVENTION

1. Field of the Invention

The invention relates to a light source module. More particularly, the invention relates to a light source module having superior light emitting efficiency.

2. Description of Related Art

Along with the flourishing developments of flat panel display technology, liquid crystal displays (LCDs) have played a major role in the mainstream display market and are widely used in people's daily lives to replace the traditional cathode ray tube (CRT) display. Since LCD panels in LCDs are not self-luminescent, light source modules are employed to provide backlight source. According to the placement of the light-emitting devices in a light source module, the light source module is categorized into a direct type light source module and a side incident light source module, where the side incident light source module is able to guide light from the side to the front so as to form a surface light source by employing a light guide plate (LGP) as the critical component.

FIG. 1A is a schematic top view of a side incident light source module. FIG. 1B illustrates a schematic cross-sectional view taken along line AA' of the light source module shown in FIG. 1A. Referring to FIGS. 1A and 1B, a light module 100 includes a light source 110, a light guide plate (LGP) 120, a reflector 130, and an optical diffuser 140. The LGP 120 has an upper surface 122, a lower surface 124 opposite to the upper surface 122, and a light entering surface 126 connecting the upper surface 122 and the lower surface 124. The upper surface 122 and the lower surface 124 are both perpendicular to the light entering surface 126, for example.

In the light source module 100, the light entering surface 126 of the LGP 120 is usually disposed with the light source 110. The light source 110 is a light emitting diode (LED) or a cold cathode fluorescent lamp (CCFL). The lower surface 124 of the LGP 120 includes a plurality of protrusion portions 121, where each of the protrusion portions 121 has the same height. After a beam 112 from the light source 110 passes through the light entering surface 126 and enters the LGP 120, since the total reflection of the beam 112 in the LGP 120 is disrupted by the foregoing protrusion portions 121, the beam 112 in the LGP 120 is guided and emitted from the upper surface 122 uniformly to exit the LGP 120.

In general, the reflector 130 is usually disposed on the lower surface 124 of the LGP 120 in the light source module 100, so that a portion of the beam 112 passing through and exiting the lower surface 124 is reflected back into the LGP 120 for increasing the backlight brightness of the light source module 100. Moreover, to enhance the overall backlight uniformity of the light source module 100, the optical diffuser 140 is further disposed on the upper surface 122 of the LGP 120 in the light source module 100 so as to enhance backlight uniformity.

Nonetheless, the overall backlight brightness enhancement remains limited even when the light source module 100 adopts light reflective structures (the protrusion portions 121) of the LGP 120 illustrated in FIG. 1. Therefore, manufacturers work on designing a micro-structure on the LGP 120 which can further increase the backlight brightness of the light source module.

SUMMARY OF THE INVENTION

The invention is directed to a light source module having superior light emitting efficiency.

The invention is directed to a light source module including a light guide plate (LGP) and a light source device. The LGP has a light exiting surface, a light reflecting surface opposite to the light exiting surface, and at least one light entering surface connecting the light exiting surface and the light reflecting surface. Moreover, a plurality of light reflective structures is formed on the light reflecting surface of the LGP. Each of the light reflective structures includes a closed light active region and a plurality of protrusions in the light active region. The light active region and the light reflecting surface are not coplanar and the protrusions extend outward from the LGP. The light source device is disposed corresponding to the light entering surface. The light source device provides a light which enters the LGP from the light entering surface and exits the LGP from the light exiting surface after the light is redirected by one of the protrusions on the light reflecting surface.

In an embodiment of the invention, each of the light reflective structures is constituted by a plurality dot patterns and any two adjacent dot patterns are partially overlapped.

In an embodiment of the invention, each of the dot patterns is a recess portion on the light reflecting surface and an edge of each dot pattern protrudes over the light reflecting surface. A joint region of the dot patterns forms the light active region, and an edge of an intersected region of the dot patterns forms each of the protrusions.

In an embodiment of the invention, each of the dot patterns is a protrusion portion on the light reflecting surface and an edge of each dot pattern recesses into the light reflecting surface. A joint region of the dot patterns forms the light active region, and an edge of an intersected region of the dot patterns forms each of a plurality of trenches separating the protrusions.

In an embodiment of the invention, the dot patterns constituting each of the light reflective structures are arranged in a straight line and an extending direction of the straight line is substantially perpendicular to a forward direction of the light.

In an embodiment of the invention, each of the dot patterns has a circular shape.

In an embodiment of the invention, each of the light reflective structures further includes a plurality of internal patterns located in the dot patterns respectively. Here, an edge of each internal pattern protrudes over or recesses into the light reflecting surface.

In an embodiment of the invention, each of the internal patterns has a circular shape.

In an embodiment of the invention, the number of the dot patterns in each of the light reflective structures increases gradually along a direction away from the light source device.

In an embodiment of the invention, the distance between any two adjacent light reflective structures gradually decreases along a direction away from the light source device.

In an embodiment of the invention, the protrusions of each light reflective structure are constituted by a plurality of dot patterns in the light active region. Each of the dot patterns is a recess portion on the light reflecting surface. Also, an edge of each dot pattern protrudes over the light reflecting surface.

In an embodiment of the invention, any two adjacent dot patterns are partially overlapped, and a joint region and an edge of an intersected region of the dot patterns form each of the protrusions.

In an embodiment of the invention, each of the light reflective structures further includes a plurality of internal patterns located in the dot patterns respectively. An edge of each internal pattern protrudes over or recesses into the light reflecting surface.

In an embodiment of the invention, any two dot patterns are adjacent to each other but do not intersect each other.

In an embodiment of the invention, the dot patterns in each of the light reflective structures are arranged in a straight line and an extending direction of the straight line is substantially perpendicular to a forward direction of the light.

In an embodiment of the invention, the dot patterns in each of the light reflective structures are arranged in an array.

In an embodiment of the invention, the protrusions of each light reflective structure are constituted by a plurality of dot patterns in the light active region. Each of the dot patterns is a protrusion portion on the light reflecting surface. Also, an edge of each dot pattern recesses into the light reflecting surface.

In an embodiment of the invention, any two adjacent dot patterns are partially overlapped, and a joint region and an edge of an intersected region of the dot patterns form each of a plurality of trenches separating the protrusions.

In an embodiment of the invention, each of the light reflective structures further includes a plurality of internal patterns located in the dot patterns respectively. Here, an edge of each internal pattern protrudes over or recesses into the light reflecting surface.

In an embodiment of the invention, any two dot patterns are adjacent to each other but do not intersect each other.

In an embodiment of the invention, the dot patterns in each of the light reflective structures are arranged in a straight line and an extending direction of the straight line is substantially perpendicular to a forward direction of the light.

In an embodiment of the invention, the dot patterns in each of the light reflective structures are arranged in an array.

The invention is further directed to a light source module including an LGP and a light source device. The LGP has a light exiting surface, a light reflecting surface opposite to the light exiting surface, and at least one light entering surface connecting the light exiting surface and the light reflecting surface. Moreover, a plurality of light reflective structures is formed on the light reflecting surface of the LGP. Each of the light reflective structures includes at least two closed sub-patterns which are tangent or intersected to one another, and each of the sub-patterns recesses into or protrudes over the light exiting surface. The light source device is disposed corresponding to the light entering surface. The light source device provides a light which enters the LGP from the light entering surface and exits the LGP from the light exiting surface after the light is redirected by one of the light reflective structures on the light reflecting surface.

In an embodiment of the invention, each of the sub-patterns is a dot pattern and any two adjacent dot patterns are tangent or intersected to each other.

In an embodiment of the invention, each of the dot patterns is a recess on the light reflecting surface and an edge of each dot pattern protrudes over the light reflecting surface.

In an embodiment of the invention, each of the dot patterns is a protrusion on the light reflecting surface and an edge of each dot pattern recesses into the light reflecting surface.

In an embodiment of the invention, the dot patterns constituting each of the light reflective structures are arranged in a straight line, and an extending direction of the straight line is substantially perpendicular to a forward direction of the light.

In an embodiment of the invention, the dot patterns in each of the light reflective structures are arranged in an array.

In an embodiment of the invention, each of the dot patterns has a circular shape.

In an embodiment of the invention, each of the light reflective structures further includes a plurality of internal patterns located in the sub-patterns respectively. Here, an edge of each internal pattern protrudes over or recesses into the light reflecting surface.

In an embodiment of the invention, each of the internal patterns has a circular shape.

In an embodiment of the invention, the number of the sub-patterns in each of the light reflective structures increases gradually along a direction away from the light source device.

In an embodiment of the invention, the distance between any two adjacent light reflective structures gradually decreases along a direction away from the light source device.

In an embodiment of the invention, each of the light reflective structures further comprises a closed base pattern which recesses into or protrudes over the light reflecting surface and encompasses a joint region of the sub-patterns in the light reflective structures.

In an embodiment of the invention, the base pattern has a rectangular shape.

In light of the foregoing, the light source module of the invention utilizes the light reflective structures on the LGP. Each of the light reflective structures includes a closed light active region and a plurality of protrusions in the light active region. Thus, when the light in the LGP is transmitted to the light reflective structures on the light reflecting surface, the light is reflected by the protrusions and then exits the LGP through the light exiting surface so as to enhance the light emitting efficiency.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2B is a schematic cross-sectional view taken along line BB' of the light source module illustrated in FIG. 2A.

FIG. 2C is a schematic cross-sectional view taken along line CC' of the light source module illustrated in FIG. 2A.

FIG. 3A is a schematic cross-sectional view taken along line BB' of the light source module illustrated in FIG. 2A according to another embodiment.

FIG. 3B is a schematic cross-sectional view taken along line CC' of the light source module illustrated in FIG. 2A according to another embodiment.

FIGS. 8A-8E are schematic views illustrating the light reflective structures of FIG. 2A in different embodiments.

DESCRIPTION OF EMBODIMENTS

Figure 2A:
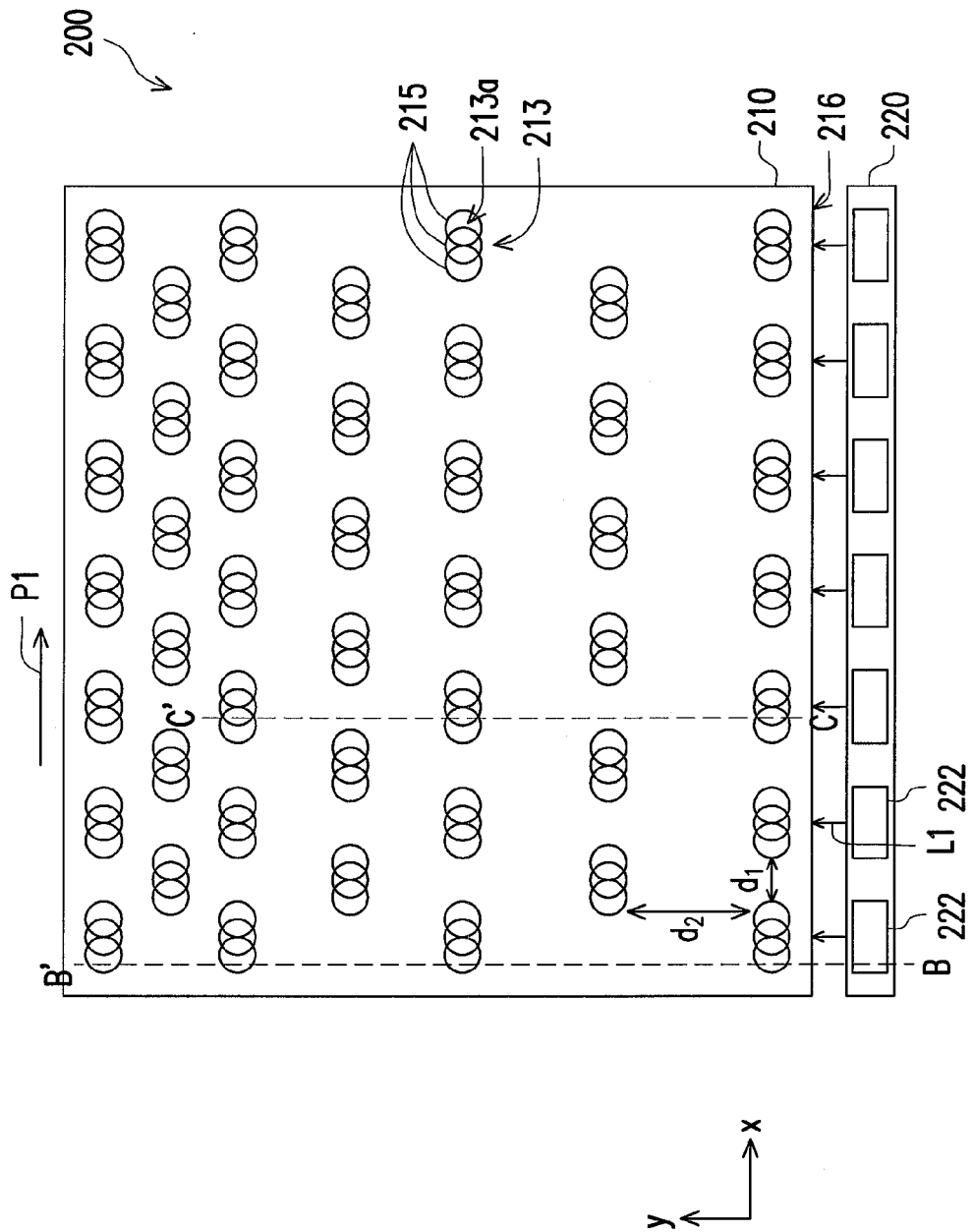
FIG. 2A shows a schematic top view of a light source module according to an embodiment of the invention.

FIG. 2A shows a schematic top view of a light source module according to an embodiment of the invention. FIG. 2B is a schematic cross-sectional view taken along line BB' of the light source module illustrated in FIG. 2A. FIG. 2C is a schematic cross-sectional view taken along line CC' of the light source module illustrated in FIG. 2A. To facilitate illustration, FIG. 2A merely shows the light source module and a light guide plate (LGP), where other possible optical components of the LGP are omitted. Referring to FIGS. 2A, 2B, and 2C, a light source module 200 of this embodiment includes an LGP 210 and a light source device 220.

The LGP 210 has a light exiting surface 212, a light reflecting surface 214 opposite to the light exiting surface 212, and at least one light entering surface 216 connecting the light exiting surface 212 and the light reflecting surface 214. Moreover, the LGP 210 has a plurality of light reflective structures 213 on the light reflecting surface 214. Each of the light reflective structures 213 includes a closed light active region 213a and a plurality of protrusions 213b in the light active region 213a. The light active region 213a and the light reflecting surface 214 are not coplanar and the protrusions 213b extend outward from the LGP 210. In the present embodiment, each of the light reflective structures 213 is constituted by a plurality dot patterns 215 and any two adjacent dot patterns 215 are partially overlapped or tangent to each other as illustrated in FIG. 2A. From another aspect, each of the light reflective structures 213 includes at least two closed sub-patterns which are tangent or intersected to one another. Here, each of the sub-patterns is deemed as each of the dot patterns 215 above-mentioned. In other words, the sub-patterns in each of the light reflective structures 213 recesses into or protrudes over the light exiting surface 212 depending on the formation thereof. The relevant description is provided in subsequent paragraphs. In addition, each of the dot patterns 215 of the present embodiment is equivalent to each of the sub-patterns, and the relevant description thereof is provided in the following.

In the embodiment of FIG. 2B, each of the dot patterns 215 is a protrusion on the light reflecting surface 214, for example, and each dot pattern 215 includes a protrusion portion 215a and an edge 215b. In details, the protrusion portions 215a are disposed on the light reflecting surface 214 and extend outward from the LGP 210 so as to protrude over the light reflecting surface 214. Therefore, the protrusion portions 215a are not coplanar with the light reflecting surface 214. Here, the so-called coplanar means in-plane. Since each of the dot patterns 215 is a protrusion structure, the edge 215b of each dot pattern 215 recesses into the light reflecting surface 214. Additionally, a joint region M1 (also referring to the peripheral region M1 in FIG. 4) of these partially overlapped or tangent dot patterns 215 in each of the light reflective structures 213 forms the light active region 213a of the light reflective structure 213. Moreover, the edges 215b of intersected regions M2 of the dot patterns 215 form a plurality of trenches 217 as shown in FIG. 2C.

In details, the method of forming the structure of the protrusion portions 215a includes dotting on a steel plate (not shown) using a laser beam (not shown). Here, the location of each of the laser dots is identical to the distribution illustrated in FIG. 2A. That is, the laser dots dotted on the steel plate are partially overlapped or tangent to each other. The method further includes stenciling the steel plate on a light-guiding substrate to form the LGP 210 shown in FIGS. 2B and 2C. It should be noted that since the laser beam is dotted on the steel plate using laser ablation, the patterns formed on the steel plate then have structures similar to a volcano. Thus, when the steel plate is stenciled on the light-guiding substrate, the structures of the edges 215b of the dot patterns 215 recessing into the light reflecting surface 214 in FIG. 2B are then formed.

However, in other embodiments, the LGP 210 can also be manufactured by directly using a laser beam to perform the foregoing dotting process on a light-guiding substrate. Consequently, the dot pattern 215 formed on the LGP 210 is a recess portion 215a on the light reflecting surface 214 and the edges 215b of each dot pattern 215 protrude over the light reflecting surface 214 as shown in FIGS. 3A and 3B. Herein, FIG. 3A is a schematic cross-sectional view taken along line BB' of the light source module illustrated in FIG. 2A according to another embodiment and FIG. 3B is a schematic cross-sectional view taken along line CC' of the light source module illustrated in FIG. 2A according to another embodiment.

In the embodiments depicted in FIGS. 3A and 3B, as the laser beam is used for dotting directly on the light reflecting surface 214 of the light-guiding substrate, each dot pattern 215 formed in each of the light reflective structures 213 is deemed as the recess on the light reflecting surface 214, and the edges 215b of each dot pattern 215 protrude over the light reflecting surface 214. Also, the joint region M1 (also referring to the peripheral region M1 in FIG. 4) of these partially overlapped or tangent dot patterns 215 in each of the light reflective structures 213 forms the foregoing light active region 213a. Moreover, the edges 215b of the intersected regions M2 (also referring to the regions M2 illustrated in FIG. 4) of the partially overlapped or tangent dot patterns 215 form a plurality of protrusions 213b.

Similarly, as the laser beam is dotted on the light-guiding substrate directly using laser ablation, the patterns formed on the LGP 210 then have structures similar to a volcano. For example, the edges 215b of the dot patterns 215 in FIG. 3A have structures protruding over the light reflecting surface 214. It should be noted that the method of forming the light reflective structures 213 of the present embodiment is not limited to laser ablation; that is, conventional laser processes, conventional etching processes, or other suitable processes can also be adopted. Accordingly, structures of the edges 215b of the dot patterns 215 recessing into the light reflecting surface 214 in FIG. 2B, or structures of the edges 215b of the dot patterns 215 protruding over the light reflecting surface 214 shown in FIG. 3A are formed.

Figure 1A:
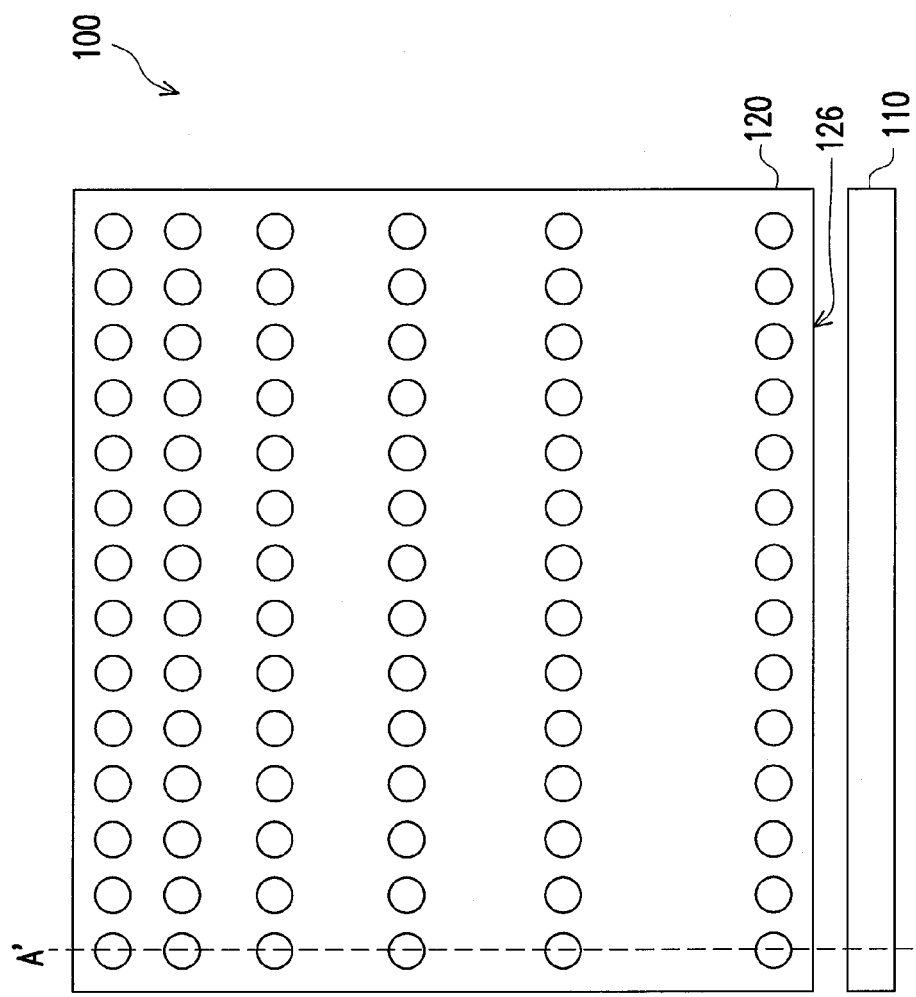
FIG. 1A is a schematic top view of a conventional side incident light source module.
Figure 1B:
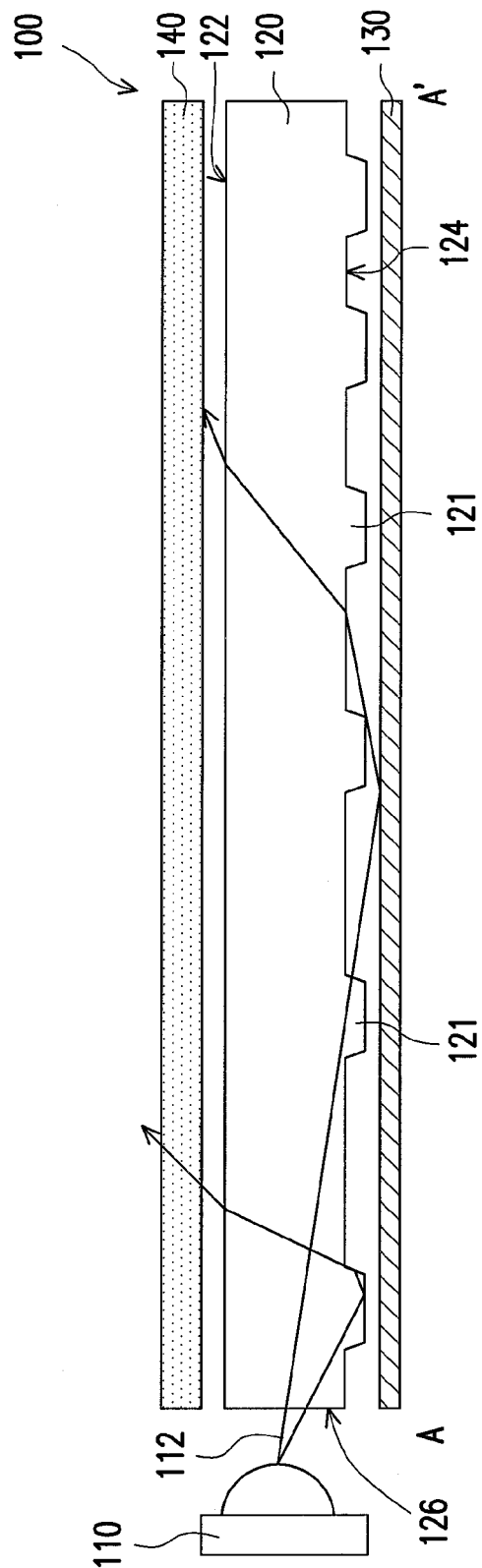
FIG. 1B is a schematic cross-sectional view taken along line AA' of the light source module illustrated in FIG. 1A.

Moreover, the light source device 220 is disposed corresponding to the light entering surface 216 of the LGP 210 as shown in FIGS. 2A, 2B and 3A. The light source device 220 provides a light L1 which enters the LGP 210 from the light entering surface 216 and exits the LGP 210 from the light exiting surface 212 after the light L1 is redirected by one of the light reflective structures 213 (i.e. the protrusions 213b) on the light reflecting surface 214 as shown in FIGS. 2B and 3B. Specifically, since each of the light reflective structures 213 on the LGP 210 is constituted by a plurality of dot patterns 215 that are partially overlapped or tangent to each other, when the light L1 in the LGP 210 is transmitted to the light reflective structures 213 on the light reflecting surface 214, the light L1 is totally reflected by the protrusions 213b easily so as to exit from the LGP 210 through the light exiting surface 212. Accordingly, the light emitting efficiency is enhanced. Furthermore, when a portion of the light L1 passes through the light reflecting surface 214 and then exits from the LGP 210, a reflector 230 is further disposed on the light reflecting surface 214 of the light source module 200 so as to transmit the light L1 back to the LGP 210 for increasing the utility of the light. For example, when the light source module 200 adopts the foregoing LGP 210, not only is the overall aperture ratio increased, but the overall light emitting brightness can also be enhanced. Moreover, experimental data show that when the light source module 200 adopts the LGP 210 having a structure of stacked dot patterns 215, the overall light emitting brightness thereof is at least increased by 10.8% comparing to the traditional LGP 120 shown in FIG. 1A.

In other words, as the light L1 is redirected by the protrusions 213b constituted by the dot patterns 215 that are partially overlapped or tangent to each other, and therefore exits from the LGP 210 through the light exiting surface 212, the overall light exiting efficiency of the light source module 200 can be enhanced by adopting the LGP 210 in the present embodiment. In the present embodiment, the light source device 220 includes a plurality of light emitting diodes (LEDs) 222 arranged in an array, for example. However, the invention is not limited thereto. In other embodiments, the light source device 220 can also adopt CCFL or other suitable light sources.

In the present embodiment, the dot patterns 215 constituting each of the light reflective structures 213 are arranged in a straight line, and an extending direction P1 of the straight line is substantially perpendicular to a forward direction of the light L1. In other words, the extending direction P1 is, for instance, the X-axis direction as illustrated in FIG. 2A.

Figure 4:
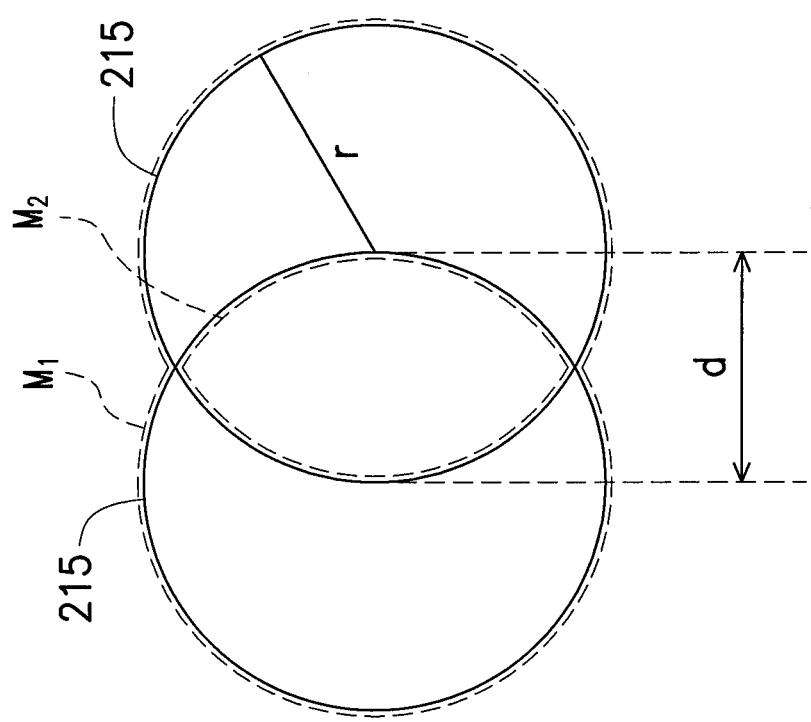
FIG. 4 is a schematic view showing partially overlapped dot patterns of light reflective structures depicted in FIG. 2A.

The overlapping degree of the partially overlapped dot patterns 215 in the light reflective structures 213 affects the light emitting efficiency provided by the light source module 200. FIG. 4 is shown as an example in the following. In the present embodiment, each dot pattern 215 is circular and has a radius r. Moreover, a distance overlapped by two adjacent dot patterns 215 is d, which is defined as the longest length of the overlapped radii of two adjacent dot patterns 215. When the partial overlap of any two adjacent dot patterns 215 falls within a range of $r/3<d<2r$, the LGP 210 can then better enhance the overall light emitting efficiency of the light source module 200. On the contrary, when the partial overlap is smaller than $r/3$, the overall light emitting efficiency of the light source module 200 enhanced by the LGP 210 is lower.

In the present embodiment, not only does the overlapping degree of the dot patterns 215 in the light reflective structures 213 affect the light emitting efficiency of the light source module 200, but the distance d1 between the light reflective structures 213 along the X-axis direction and a distance d2 between the light reflective structures 213 along the Y-axis direction also affect the light emitting efficiency of the light source module 200. For instance, in FIG. 2A, the distance d2 between any two light reflective structures 213 along the Y-axis direction gradually decreases along a direction away from the light source device 220, for example. Hence, the light exiting surface 212 farther from the light source device 220 is capable of providing sufficient illumination. In other words, when the LGP 210 applies the distribution of the light reflective structures 213 as illustrated in FIG. 2A, the light source module 200 can then have superior overall light emitting efficiency and uniform light emitting uniformity.

Figure 5:
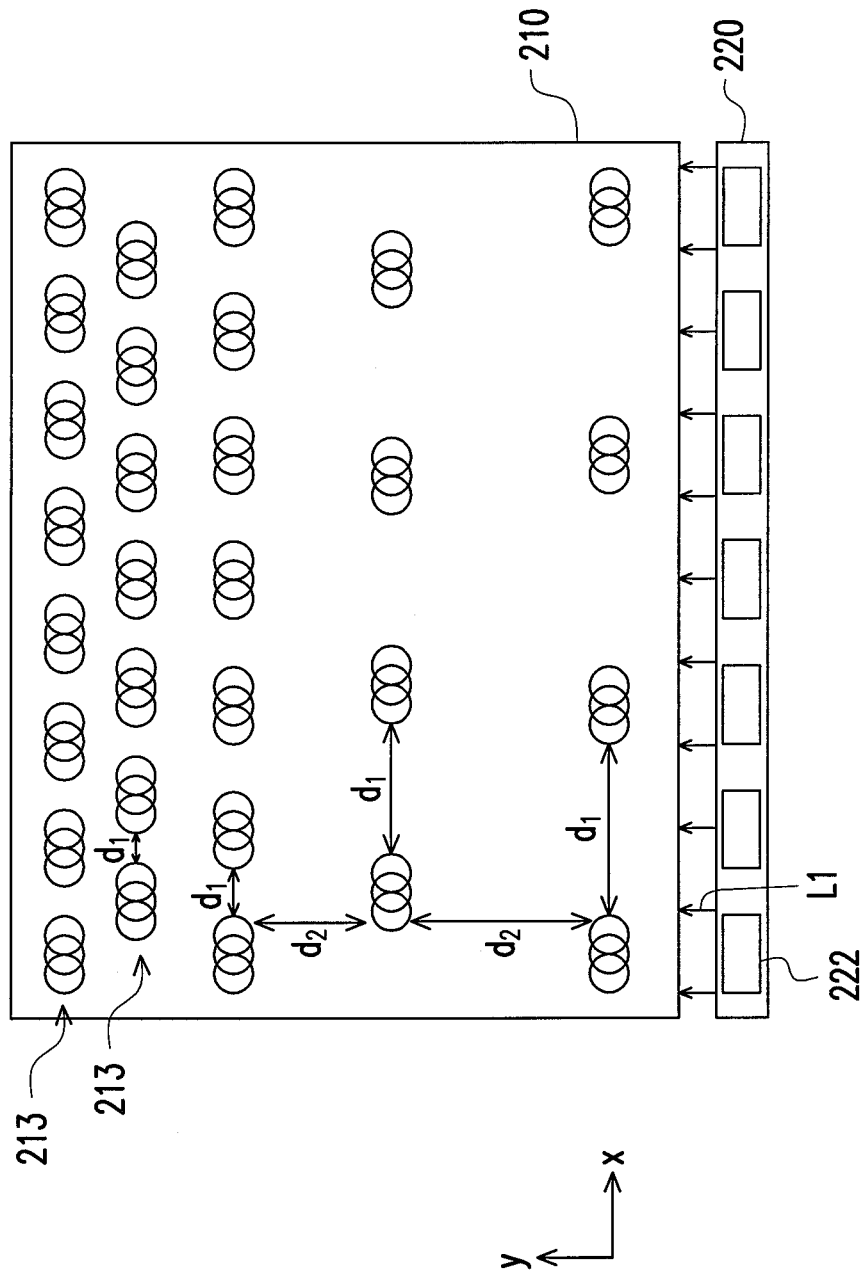
FIGS. 5-7 are respectively schematic top views showing arrangements and numbers of dot patterns of light reflective structures in the light source module in different embodiments.

In another embodiment, the arrangement of the light reflective structures 213 on the LGP 210 can be the arrangement shown in FIG. 5. In FIG. 5, the distance d1 of any two adjacent light reflective structures 213 along the X-axis direction also decreases along the Y-axis direction (that is, the direction away from the light source device 220). The light source module 200 can also have superior overall light emitting efficiency and uniform light emitting uniformity when the arrangement of the light reflective structures 213 shown in FIG. 5 is adopted.

Figure 6:
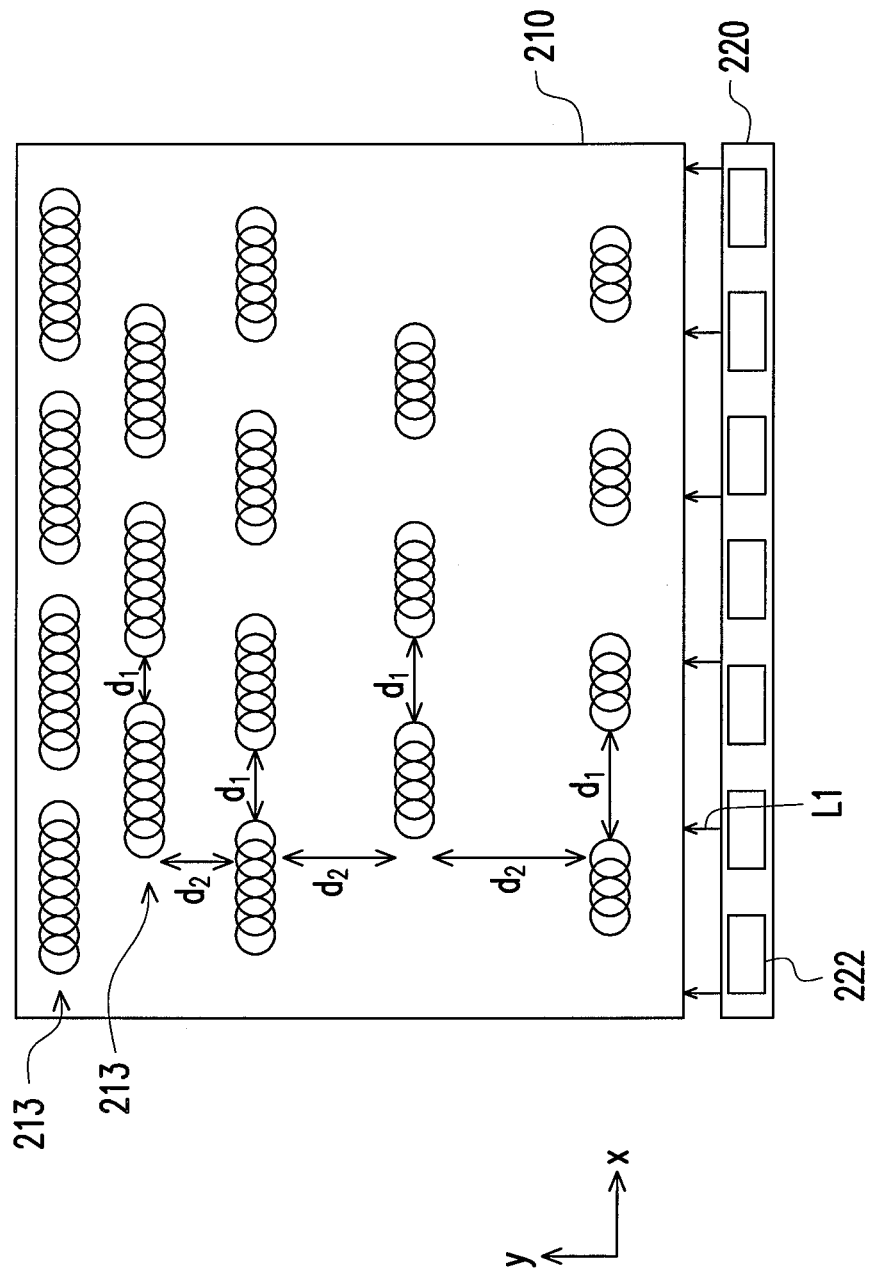
Figure 7:
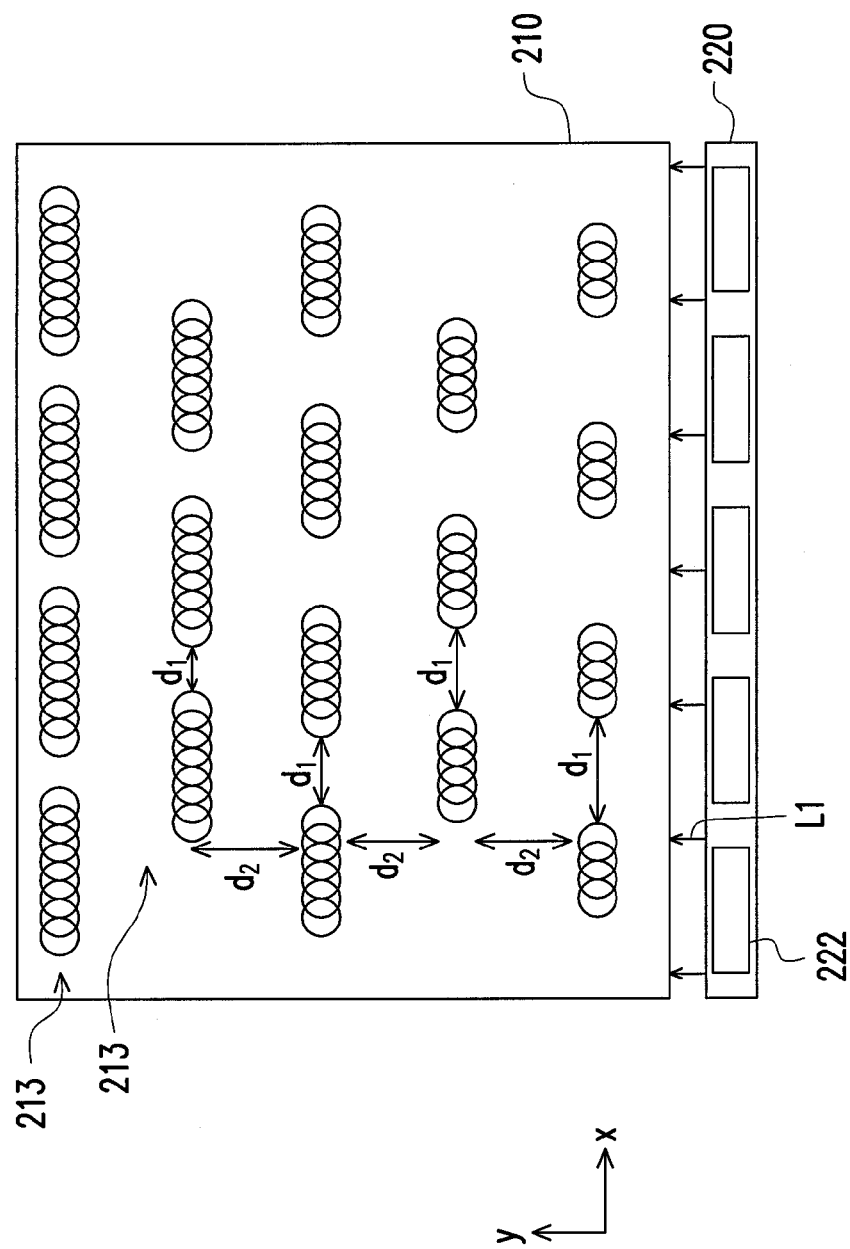

Also, in FIGS. 2 and 5, the numbers of the dot patterns 215 in each light reflective structure 213 are the same, and the variations merely differ in the distances d1, d2 between the light reflective structures 213. In another embodiment, the number of dot patterns 215 in the light reflective structures 213 changes along the direction away from the light source device 220, as shown in FIGS. 6 and 7. In FIG. 6, the number of dot patterns 215 in each light reflective structure 213 increases gradually along the direction away from the light source device 220. Additionally, the distance d2 of each light reflective structure 213 along the Y-axis direction decreases gradually along a direction away from the light source device 220. The distance d1 of each light reflective structure 213 along the X-axis direction decreases gradually along a direction away from the light source device 220. The arrangements of the light reflective structures 213 in FIGS. 7 and 6 are similar. However, the arrangements are different in that the distance d2 of each of the light reflective structures 213 along the Y-axis direction is fixed in FIG. 7. Similarly, whether the LGP 210 in the light source module 200 adopts the arrangement of the light reflective structures 213 as illustrated in FIG. 6 or 7, the light source module 200 can still have superior overall light emitting efficiency and uniform light emitting uniformity.

In the present embodiment, the light reflective structures 213 on the light reflecting surface 214 of the LGP 210 not only can apply the design of the dot patterns 215 shown in FIGS. 2A, 5, 6, and 7, but can also use the light reflective structures 213 illustrated in FIGS. 8A-8E. Here, the manufacture of the light reflective structures 213 in FIGS. 8A-8E includes the foregoing laser ablation, or the conventional laser or etching processes. In the following, structures of the light reflective structures 213 in FIGS. 8A-8E are respectively illustrated in details.

Figure 8A:
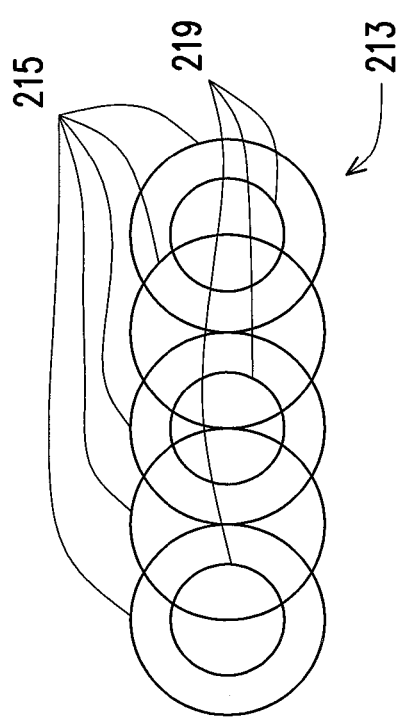

In FIG. 8A, each of the light reflective structures 213 further includes a plurality of internal patterns 219 located in the dot patterns 215 respectively. An edge of each internal pattern 219 protrudes over or recesses into the light reflecting surface 214. Notably, whether the internal patterns 219 protrude over or recess into the light reflecting surface 214 depends on the method of forming the dot patterns 215. For example, when the dot patterns 215 are formed by using the foregoing steel plate stenciling method, the internal patterns 219 can also be formed using the same method or other laser or etching processes. In the present embodiment, the pattern of the internal patterns 219 is circular; however, the invention is not limited thereto.

Figure 8B:
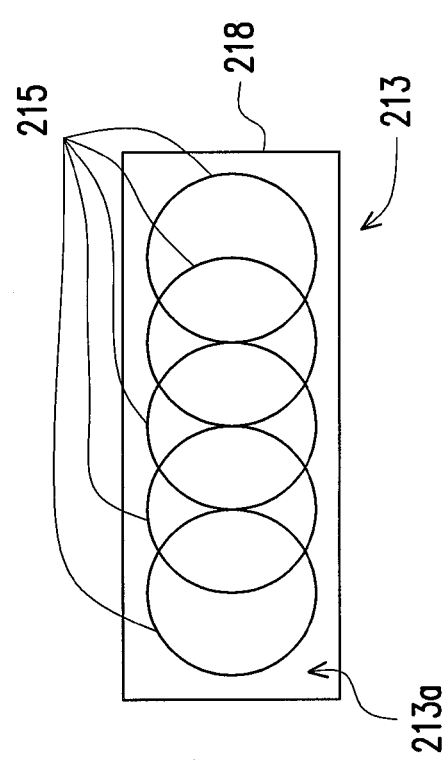

In FIG. 8B, each of the light reflective structures 213 further includes a closed base pattern 218 which recesses into or protrudes over the light reflecting surface 214 and encompasses the joint region M1 of the dot patterns 215 in the light reflective structures 213. Similarly, whether the base pattern 218 protrudes over or recesses into the light reflecting surface 214 depends on the method of forming the dot patterns 215, and the details are thus omitted herein. In the present embodiment, the pattern of the base patterns 218 is rectangular; however, the invention is not limited thereto.

From another aspect, the protrusions 213b of each light reflective structure 213 in FIG. 8B can be constituted by a plurality of dot patterns 215 located in the light active region 213a. For example, when the light reflective structure 213 in FIG. 8B is manufactured using the method illustrated in FIG. 3A, then each dot pattern 215 is the recess portion 215c located on the light reflecting surface 214 and the edges 215b of each dot pattern 215 protrude over the light reflecting surface 214. On the contrary, when the light reflective structure 213 in FIG. 8B is manufactured using the method illustrated in FIG. 2B, each dot pattern 215 is then the protrusion portion 215a located on the light reflecting surface 214 and the edges 215b of each dot pattern 215 recess into the light reflecting surface 214. Also, the light reflective structure 213 shown in FIG. 8C can be formed by adding the internal patterns 219 provided in FIG. 8A into the light reflective structure 213 of FIG. 8B.

Figure 8E:
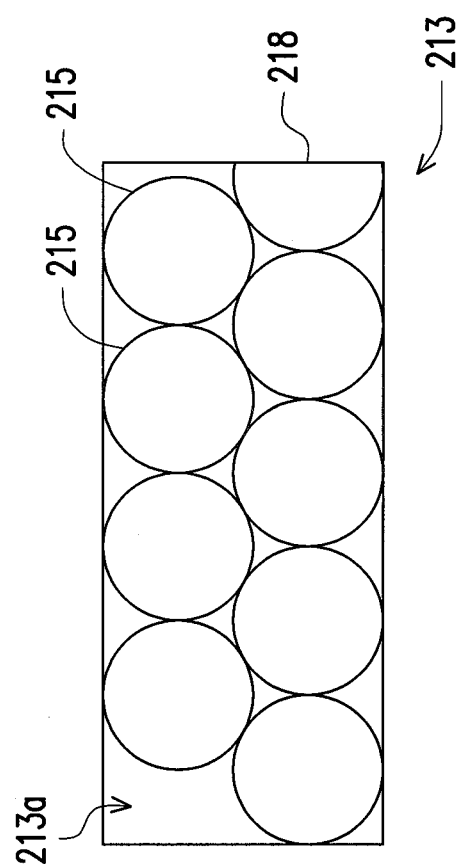

Additionally, the light reflective structure 213 in FIG. 8D is similar to the light reflective structure 213 in FIG. 8B. However, the two light reflective structures 213 are different in that any two dot patterns 215 in FIG. 8D are adjacent and tangent to each other. The light reflective structure 213 in FIG. 8E is similar to the light reflective structure 213 in FIG. 8D. Nonetheless, the dot patterns 215 in FIG. 8E are arranged in an array. In the light source module 200, the light reflective structure 213 on the LGP 210 obtains the foregoing advantages by adopting the design of the dot patterns 215 shown in FIGS. 2A, 5, 6, and 7. Moreover, the light reflective structure 213 is also capable of providing superior overall light emitting efficiency by using the structures depicted in FIGS. 8A-8E.

In the present embodiment, the light source module 200 also includes an optical diffuser 240 disposed on the light exiting surface 212 of the LGP 210. As a consequence, the light provided by the light source module 200 can be further uniformed.

To sum up, the light source module of the invention has at least the following advantages. Firstly, the LGP has a plurality of light reflective structures on the light reflecting surface, where each light reflective structure includes a closed light active region and a plurality of protrusions located in the light active region. Therefore, when the light in the LGP is transmitted to the light reflective structures on the light reflecting surface, the light is reflected by the protrusions and then exits the LGP through the light exiting surface so as to enhance light emitting efficiency. From another aspect, since each light reflective structure includes at least two closed sub-patterned that are tangent or intersected to one another, and each sub-pattern can recess into or protrude over the light exiting surface, the overall light emitting efficiency of the LGP can be enhanced after the light is redirected by the light reflective structures to exit the LGP through the light exiting surface.

By setting the distance between the light reflective structures, not only is the light emitting efficiency of the LGP further enhanced, but the light exiting the LGP is also more uniform. Further, the light emitting efficiency can be enhanced and the light emitted can be more uniform by suitably changing the number of dot patterns in each light reflective structure (i.e. the number gradually increases along a direction away from the light source device).

The light reflective structures can further apply other suitable patterns for forming a plurality of protrusions in the light active region so as to facilitate the enhancement in light emitting efficiency. Furthermore, a reflector can be further disposed on the light reflecting surface to transmit the light which passes through the light reflecting surface and exits the LGP back to the LGP for increasing the utility of the light.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions. Additionally, any embodiment or claim of the invention does not need to attain all of the advantages or features disclosed in the invention. The abstract and title are merely used for facilitating the search for patent documents, and the scope of the invention is not limited thereto.

What is claimed is:

1. A light source module, comprising:
a light guide plate having a light exiting surface, a light reflecting surface opposite to the light exiting surface, and at least one light entering surface connecting the light exiting surface and the light reflecting surface, the light guide plate having a plurality of light reflective structures on the light reflecting surface, each of the light reflective structures comprising a closed light active region and a plurality of protrusions in the light active region, wherein the light active region and the light reflecting surface are not coplanar and the protrusions extend outward from the light guide plate; and
a light source device, disposed corresponding to the light entering surface, and providing a light entering the light guide plate from the light entering surface and exiting the light guide plate from the light exiting surface after the light is redirected by one of the protrusions on the light reflecting surface, wherein each of the light reflective structures is constituted by a plurality dot patterns and any two adjacent dot patterns are partially overlapped, each dot pattern is circular, a radius of each dot pattern is r, a distance overlapped by the two adjacent dot patterns is d, and $r/3 < d < 2r$.

2. The light source module as claimed in claim 1, wherein each of the dot patterns is a recess portion on the light reflecting surface, an edge of each dot pattern protrudes over the light reflecting surface, a joint region of the dot patterns forms the light active region, and an edge of an intersected region of the dot patterns forms each of the protrusions.

3. The light source module as claimed in claim 1, wherein each of the dot patterns is a protrusion portion on the light reflecting surface, an edge of each dot pattern recesses into the light reflecting surface, a joint region of the dot patterns forms the light active region, and an edge of an intersected region of the dot patterns forms each of a plurality of trenches separating the protrusions.

4. The light source module as claimed in claim 1, wherein the dot patterns constituting each light reflective structure are arranged in a straight line and an extending direction of the straight line is substantially perpendicular to a forward direction of the light.

5. The light source module as claimed in claim 1, wherein each of the dot patterns has a circular shape.

6. The light source module as claimed in claim 1, wherein each of the light reflective structures further comprises a plurality of internal patterns located in the dot patterns respectively, and an edge of each of the internal patterns protrudes over or recesses into the light reflecting surface.

7. The light source module as claimed in claim 6, wherein each of the internal patterns has a circular shape.

8. The light source module as claimed in claim 1, wherein a number of the dot patterns in each of the light reflective structures increases gradually along a direction away from the light source device.

9. The light source module as claimed in claim 8, wherein a distance between any two adjacent light reflective structures gradually decreases along a direction away from the light source device.

10. A light source module, comprising:

a light guide plate having a light exiting surface, a light reflecting surface opposite to the light exiting surface, and at least one light entering surface connecting the light exiting surface and the light reflecting surface, the light guide plate having a plurality of light reflective structures on the light reflecting surface, each of the light reflective structures comprising a closed light active region and a plurality of protrusions in the light active region, wherein the light active region and the light reflecting surface are not coplanar and the protrusions extend outward from the light guide plate; and a light source device, disposed corresponding to the light entering surface, and providing a light entering the light guide plate from the light entering surface and exiting the light guide plate from the light exiting surface after the light is redirected by one of the protrusions on the light reflecting surface, wherein the protrusions of each light reflective structure are constituted by a plurality of dot patterns in the light active region, each of the dot patterns is a recess portion on the light reflecting surface, an edge of each dot pattern protrudes over the light reflecting surface, any two adjacent dot patterns are partially overlapped, an edge of a joint region and an edge of an intersected region of the dot patterns form the protrusions, each dot pattern is circular, a radius of each dot pattern is r, a distance overlapped by the two adjacent dot patterns is d, and r/3<d<2r.

11. The light source module as claimed in claim 10, wherein each of the light reflective structures further comprises a plurality of internal patterns located in the dot patterns respectively, and an edge of each internal pattern protrudes over or recesses into the light reflecting surface.

12. The light source module as claimed in claim 10, wherein the dot patterns in each of the light reflective structures are arranged in a straight line and an extending direction of the straight line is substantially perpendicular to a forward direction of the light.

13. The light source module as claimed in claim 10, wherein the dot patterns in each of the light reflective structures are arranged in an array.

14. A light source module, comprising:

a light guide plate having a light exiting surface, a light reflecting surface opposite to the light exiting surface, and at least one light entering surface connecting the light exiting surface and the light reflecting surface, the light guide plate having a plurality of light reflective structures on the light reflecting surface, each of the light reflective structures comprising a closed light active region and a plurality of protrusions in the light active region, wherein the light active region and the light reflecting surface are not coplanar and the protrusions extend outward from the light guide plate; and a light source device, disposed corresponding to the light entering surface, and providing a light entering the light guide plate from the light entering surface and exiting the light guide plate from the light exiting surface after the light is redirected by one of the protrusions on the light reflecting surface, wherein the protrusions of each light reflective structure are constituted by a plurality of dot patterns in the light active region, each of the dot patterns is a protrusion portion on the light reflecting surface, an edge of each dot pattern recesses into the light reflecting surface, any two adjacent dot patterns are partially overlapped, an edge of a joint region and an edge of an intersected region of the dot patterns form each of a plurality of trenches separating the protrusions, each dot pattern is circular, a radius of each dot pattern is r, a distance overlapped by the two adjacent dot patterns is d, and r/3<d<2r.

15. The light source module as claimed in claim 14, wherein each of the light reflective structures further comprises a plurality of internal patterns located in the dot patterns respectively, and an edge of each internal pattern protrudes over or recesses into the light reflecting surface.

16. The light source module as claimed in claim 14, wherein the dot patterns in each light reflective structure are arranged in a straight line and an extending direction of the straight line is substantially perpendicular to a forward direction of the light.

17. The light source module as claimed in claim 14, wherein the dot patterns in each of the light reflective structures are arranged in an array.

18. A light source module, comprising:

a light guide plate having a light exiting surface, a light reflecting surface opposite to the light exiting surface, and at least one light entering surface connecting the light exiting surface and the light reflecting surface, wherein a plurality of light reflective structures is formed on the light reflecting surface of the light guide plate, each of the light reflective structures comprises at least two closed sub-patterns which are intersected to one another, each of the sub-patterns recesses into or protrudes over the light exiting surface, each of the sub-patterns comprises a dot pattern, any two adjacent dot patterns are partially overlapped with each other, each dot pattern is circular, a radius of each dot pattern is r, a distance overlapped by the two adjacent dot patterns is d, and r/3<d<2r; and a light source device, disposed corresponding to the light entering surface, and providing a light entering the light guide plate from the light entering surface and exiting the light guide plate from the light exiting surface after the light is redirected by one of the light reflective structures on the light reflecting surface.

19. The light source module as claimed in claim 18, wherein each of the sub-patterns is a dot pattern and any two adjacent dot patterns are intersected to each other.

20. The light source module as claimed in claim 19, wherein each of the dot patterns is a recess on the light reflecting surface and an edge of each dot pattern protrudes over the light reflecting surface.

21. The light source module as claimed in claim 19, wherein each of the dot patterns is a protrusion on the light reflecting surface and an edge of each dot pattern recesses into the light reflecting surface.

22. The light source module as claimed in claim 19, wherein the dot patterns constituting each light reflective structure are arranged in a straight line and an extending direction of the straight line is substantially perpendicular to a forward direction of the light.

23. The light source module as claimed in claim 19, wherein the dot patterns of each light reflective structure are arranged in an array.

24. The light source module as claimed in claim 19, wherein each of the dot patterns has a circular shape.

25. The light source module as claimed in claim 18, wherein each of the light reflective structures further comprises a plurality of internal patterns located in the sub-patterns respectively, and each of the internal patterns protrudes over or recesses into the light reflecting surface.

26. The light source module as claimed in claim 25, wherein each of the internal patterns has a circular shape.

27. The light source module as claimed in claim 18, wherein a number of the sub-patterns in each of the light reflective structures increases gradually along a direction away from the light source device.

28. The light source module as claimed in claim 27, wherein a distance between any two adjacent light reflective structures gradually decreases along a direction away from the light source device.

29. The light source module as claimed in claim 18, wherein each of the light reflective structures further comprises a closed base pattern recessing into or protruding over the light reflecting surface and encompasses a joint region of the sub-patterns in the light reflective structures.

30. The light source module as claimed in claim 29, wherein the base pattern has a rectangular shape.

\* \* \* \* \*